US011910072B2

(12) United States Patent
Long et al.

(10) Patent No.: US 11,910,072 B2
(45) Date of Patent: Feb. 20, 2024

(54) MULTI-SCREEN INTERACTIVE DISPLAY METHOD AND APPARATUS

(71) Applicant: SHANGHAI HODE INFORMATION TECHNOLOGY CO., LTD., Shanghai (CN)

(72) Inventors: Chunyu Long, Shanghai (CN); Hao Wang, Shanghai (CN); Yaoqi Zhang, Shanghai (CN); Zhihui Yang, Shanghai (CN); Menghui Wang, Shanghai (CN); Lei Huang, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/923,226

(22) PCT Filed: Dec. 29, 2020

(86) PCT No.: PCT/CN2020/141032
§ 371 (c)(1),
(2) Date: Nov. 3, 2022

(87) PCT Pub. No.: WO2021/223453
PCT Pub. Date: Nov. 11, 2021

(65) Prior Publication Data
US 2023/0188813 A1 Jun. 15, 2023

(30) Foreign Application Priority Data
May 6, 2020 (CN) .......................... 202010374621.1

(51) Int. Cl.
H04N 21/8545 (2011.01)
H04N 21/41 (2011.01)
(Continued)

(52) U.S. Cl.
CPC ..... *H04N 21/8545* (2013.01); *H04N 21/4126* (2013.01); *H04N 21/4788* (2013.01); *H04N 21/4882* (2013.01)

(58) Field of Classification Search
CPC .......... H04N 21/8545; H04N 21/4126; H04N 21/4788; H04N 21/4882
See application file for complete search history.

(56) References Cited

U.S. PATENT DOCUMENTS

2010/0263005 A1* 10/2010 White ..................... H04L 67/02
709/206
2013/0179605 A1 7/2013 Huang et al.
(Continued)

FOREIGN PATENT DOCUMENTS

CN 103067383 A 4/2013
CN 103581704 A 2/2014
(Continued)

OTHER PUBLICATIONS

International Patent Application No. PCT/CN2020/141032; Int'l Search Report; dated Mar. 17, 2021; 3 pages.

*Primary Examiner* — Mulugeta Mengesha
(74) *Attorney, Agent, or Firm* — BakerHostetler

(57) ABSTRACT

The present disclosure discloses techniques for multi-screen interactive display. The techniques comprise receiving a screen projection request from a screen projection device, and establishing an audio and video data connection channel with the screen projection terminal device; acquiring audio and video data through the audio and video data connection channel, and displaying the audio and video data on a target display window; receiving an interactive request from the screen projection terminal device, and determining a type of interactive data based on the interactive request; establishing an interactive data connection channel with the screen projection terminal device based on the type of the interac-
(Continued)

tive data; and receiving the interactive data of the screen projection terminal device through the interactive data connection channel, and displaying the interactive data on the target display window.

19 Claims, 7 Drawing Sheets

(51) Int. Cl.
  *H04N 21/4788* (2011.01)
  *H04N 21/488* (2011.01)

(56) References Cited

U.S. PATENT DOCUMENTS

| 2014/0201793 | A1 | 7/2014 | Walker et al. | |
| 2017/0272824 | A1* | 9/2017 | Bunner | H04W 76/14 |
| 2018/0367587 | A1* | 12/2018 | Huang | H04L 67/75 |
| 2019/0058923 | A1* | 2/2019 | Champy | H04N 21/8186 |
| 2020/0336804 | A1* | 10/2020 | Cui | H04N 21/4781 |
| 2022/0224968 | A1* | 7/2022 | Wang | G06F 3/1423 |

FOREIGN PATENT DOCUMENTS

| CN | 105245801 A | 1/2016 |
| CN | 105828171 A | 8/2016 |
| CN | 106792055 A | 5/2017 |
| CN | 108616764 A | 10/2018 |
| CN | 108668027 A | 10/2018 |
| CN | 108829482 A | 11/2018 |
| CN | 109474670 A | 3/2019 |
| CN | 109996097 A | 7/2019 |
| CN | 110392226 A | 10/2019 |
| CN | 110597474 A | 12/2019 |
| CN | 110602805 A | 12/2019 |
| CN | 110620953 A | 12/2019 |
| CN | 110913013 A | 3/2020 |
| CN | 111309279 A | 6/2020 |
| CN | 111629240 A | 9/2020 |

* cited by examiner

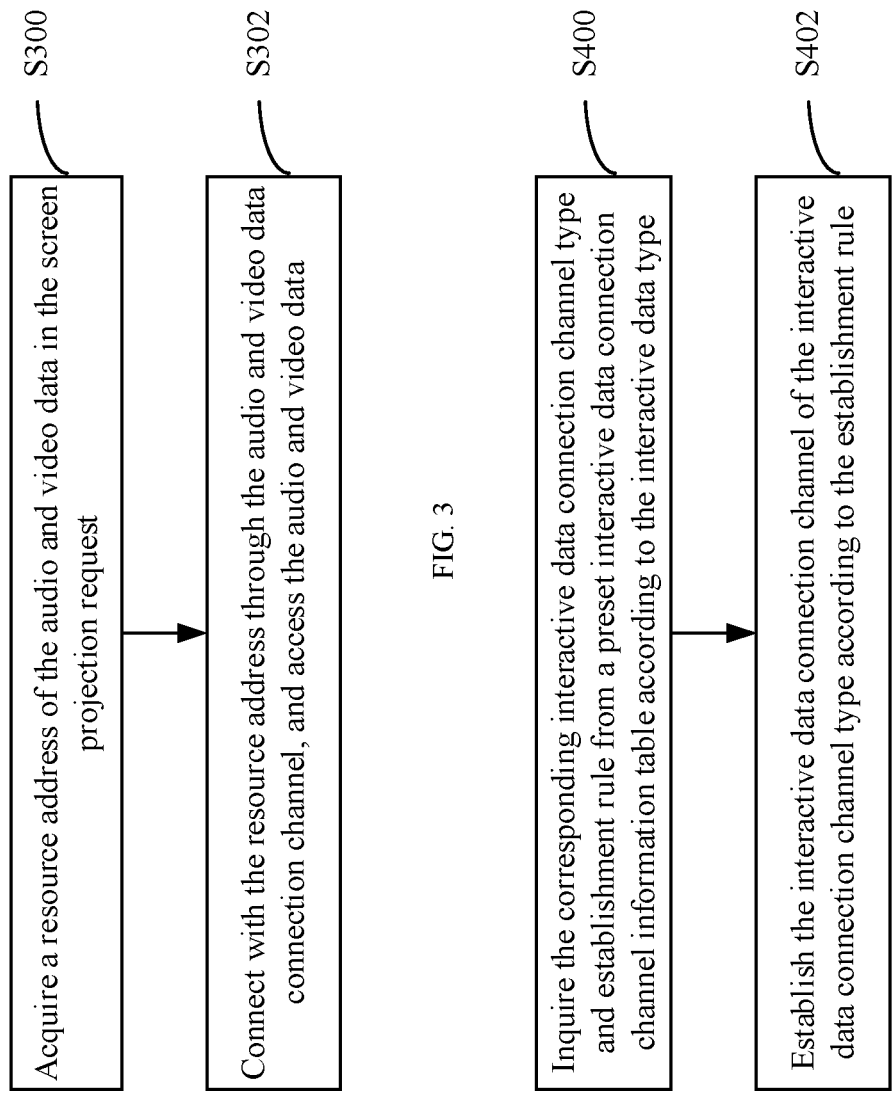

MULTI-SCREEN INTERACTIVE DISPLAY METHOD AND APPARATUS

CROSS-REFERENCE TO RELATED APPLICATIONS

The present disclosure is the U.S. National Stage of International Application No. PCT/CN2020/141032, filed on Dec. 29, 2020, which claims the priority to the Chinese Patent Application No. 202010374621.1 titled "MULTI-SCREEN INTERACTIVE DISPLAY METHOD AND APPARATUS" filed to the China Patent Office on May 6, 2020, both of which are incorporated herein by reference in their entireties.

FIELD OF TECHNOLOGY

The present disclosure relates to the field of Internet technologies, and in particular, to a multi-screen interactive display method and apparatus, a computer device, and a computer-readable storage medium.

BACKGROUND

With the development of computer technology, more and more kinds of electronic devices are developed and widely used. Various types of electronic devices generally have their own characteristics. For example, mobile phones have better portability, TV screens have better display effect, and speakers have better sound quality. In order to give full play to the characteristics of different electronic devices, electronic devices may switch and display contents among multiple devices by means of screen projection or the like.

However, it is found that the existing screen projection technology only supports audio and video screen projection, but can't show other interactive data. Therefore, the content of screen projection is relatively simple and the interactivity is poor.

SUMMARY

The present disclosure provides a multi-screen interactive display method and apparatus, a computer device, and a computer-readable storage medium, which can solve the problems of single screen projection content and poor interactivity in the prior art.

Firstly, in order to achieve the above objectives, the present disclosure provides a multi-screen interactive display method, which includes:

receiving a screen projection request from a screen projection terminal device, and establishing an audio and video data connection channel with the screen projection terminal device; acquiring audio and video data through the audio and video data connection channel, and displaying the audio and video data on a target display window; receiving an interactive request of the screen projection terminal device, and acquiring the interactive data type in the interactive request; establishing an interactive data connection channel with the screen projection terminal device according to the interactive data type; and receiving interactive data of the screen projection terminal device through the interactive data connection channel, and displaying the interactive data on the target display window.

In one example, acquiring audio and video data through the audio and video data connection channel includes: acquiring a resource address of the audio and video data in the screen projection request; and connecting with the resource address through the audio and video data connection channel, and accessing the audio and video data.

In one example, the interactive data type includes at least one of text, picture, bullet screen comment, reward and gift.

In one example, establishing the interactive data connection channel with the screen projection terminal device according to the interactive data type includes: inquiring the corresponding interactive data connection channel type and establishment rule from a preset interactive data connection channel information table according to the interactive data type; and establishing the interactive data connection channel of the interactive data connection channel type according to the establishment rule.

In one example, the establishment rule includes establishing a data communication link through a preset protocol; and the interactive data connection channel includes a communication link supporting the transmission of interactive data of at least one interactive data type.

In one example, the method further includes: sending the interactive data to an interactive server; and receiving interactive feedback data from other terminal devices on the interactive data returned by the interactive server, and displaying the interactive feedback data on the target display window.

In one example, the method further includes sending the interactive feedback data to the screen projection terminal device through an interactive connection channel.

In addition, in order to achieve the above objectives, the present disclosure further provides a multi-screen interactive display apparatus, which includes:

a first receiving module, configured to receive a screen projection request from a screen projection terminal device, and establishing an audio and video data connection channel with the screen projection terminal device; a first display module, configured to acquire audio and video data through the audio and video data connection channel, and display the audio and video data on a target display window; a second receiving module, configured to receive an interactive request of the screen projection terminal device, and acquiring the interactive data type in the interactive request; an establishing module, configured to establish an interactive data connection channel with the screen projection terminal device according to the interactive data type; and a second display module, configured to receive interactive data of the screen projection terminal device through the interactive data connection channel, and display the interactive data on the target display window.

Further, the present disclosure further provides a computer device, the computer device includes a memory and a processor, the memory stores computer-readable instructions that can be executed on the processor, and the computer-readable instructions, when executed by the processor, implement the following steps:

receiving a screen projection request from a screen projection terminal device, and establishing an audio and video data connection channel with the screen projection terminal device; acquiring audio and video data through the audio and video data connection channel, and displaying the audio and video data on a target display window; receiving an interactive request of the screen projection terminal device, and acquiring the interactive data type in the interactive request; establishing an interactive data connection channel with the screen projection terminal device according to the interactive data type; and receiving interactive data of the screen projection terminal device through the interactive data connection channel, and displaying the interactive data on the target display window.

Further, in order to achieve the above objectives, the present disclosure further provides a computer-readable storage medium, the computer-readable storage medium stores computer-readable instructions, and the computer-readable instructions can be executed by at least one processor to cause the at least one processor to perform the following steps:

receiving a screen projection request from a screen projection terminal device, and establishing an audio and video data connection channel with the screen projection terminal device; acquiring audio and video data through the audio and video data connection channel, and displaying the audio and video data on a target display window; receiving an interactive request of the screen projection terminal device, and acquiring the interactive data type in the interactive request; establishing an interactive data connection channel with the screen projection terminal device according to the interactive data type; and receiving interactive data of the screen projection terminal device through the interactive data connection channel, and displaying the interactive data on the target display window.

The multi-screen interactive display method and apparatus, the computer device and the computer-readable storage medium provided by the present disclosure can: establish an audio and video data connection channel after receiving a screen projection request from a screen projection terminal device, acquire audio and video data through the audio and video data connection channel, and display the audio and video data on a target display window; then, receive an interactive request of the screen projection terminal device, acquire the interactive data type in the interactive request, and establish an interactive data connection channel with the screen projection terminal device according to the interactive data type; finally, receive interactive data of the screen projection terminal device through the interactive data connection channel, and display the interactive data on the target display window. By establishing the interactive data connection channel independent of the audio and video data connection channel, more types of screen projection contents are supported, and the interactivity of screen projection is implemented.

BRIEF DESCRIPTION OF THE DRAWINGS

FIG. 3 is a schematic flowchart of a specific embodiment of acquiring audio and video data through the audio and video data connection channel at step S202;

FIG. 4 is a schematic flowchart of a specific embodiment of establishing an interactive data connection channel with the screen projection terminal device according to the interactive data type at step S206;

DETAILED DESCRIPTION OF THE EMBODIMENTS

In order to make the objectives, technical schemes and advantages of the present disclosure clearer, the present disclosure will be further described in detail below with reference to the accompanying drawings and embodiments. It is to be understood that the specific embodiments described here are only intended to describe the present disclosure, and are not intended to limit the present disclosure. Based on the embodiments in the present disclosure, all other embodiments acquired by a person of ordinary skill in the art without creative work shall fall within the protection scope of the present disclosure.

It should be noted that the descriptions of "first", "second" and the like in the present disclosure are only intended for descriptive purposes, and cannot be understood as indicating or implying their relative importance or implicitly indicating the number of indicated technical features. Therefore, the features defined with "first" or "second" may explicitly or implicitly include at least one of the features. In addition, the technical schemes of various embodiments may be combined with each other, but it must be based on the implementation of a person of ordinary skill in the art. When the combination of technical schemes is contradictory or impossible, it should be considered that the combination of such technical schemes does not exist and is not within the protection scope claimed in the present disclosure.

Figure 1:
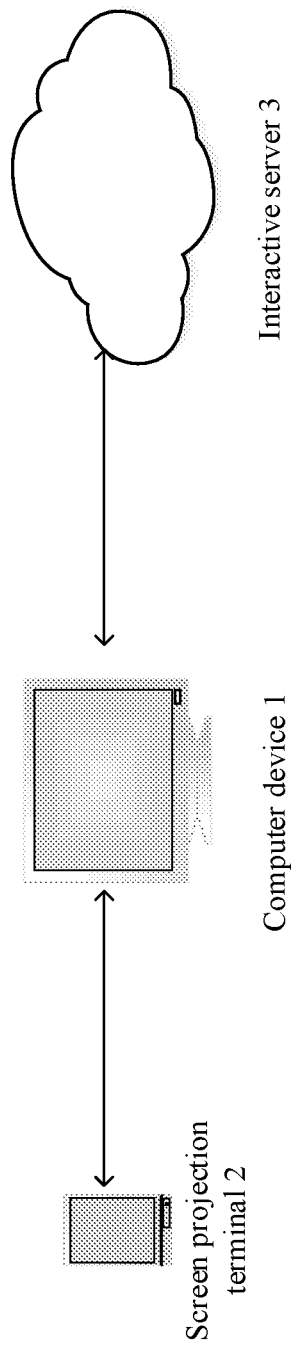
FIG. 1 is a schematic diagram of an application environment of an embodiment of the present disclosure.

FIG. 1 is a schematic diagram of an application environment of an embodiment of the present disclosure. Referring to FIG. 1, the computer device 1 is connected to the screen projection terminal device 2 and the interactive server 3, and can: receive the screen projection display request sent by the screen projection terminal device 2, establish an audio and video data connection channel with the screen projection terminal device 2, acquire audio and video data through the audio and video data connection channel, and display the audio and video data on a target display window; then, receive an interactive request of the screen projection terminal device 2, acquire the interactive data type in the interactive request, and establish an interactive data connection channel with the screen projection terminal device according to the interactive data type; finally, receive interactive data of the screen projection terminal device through the interactive data connection channel, and display the interactive data on the target display window. In this embodiment, the screen projection terminal device 2 may be a mobile phone, a tablet, a portable device, or a PC; the computer device 1 may be a mobile phone, a tablet, a portable device, a PC, or an electronic device with a display function.

Embodiment One

Figure 2:
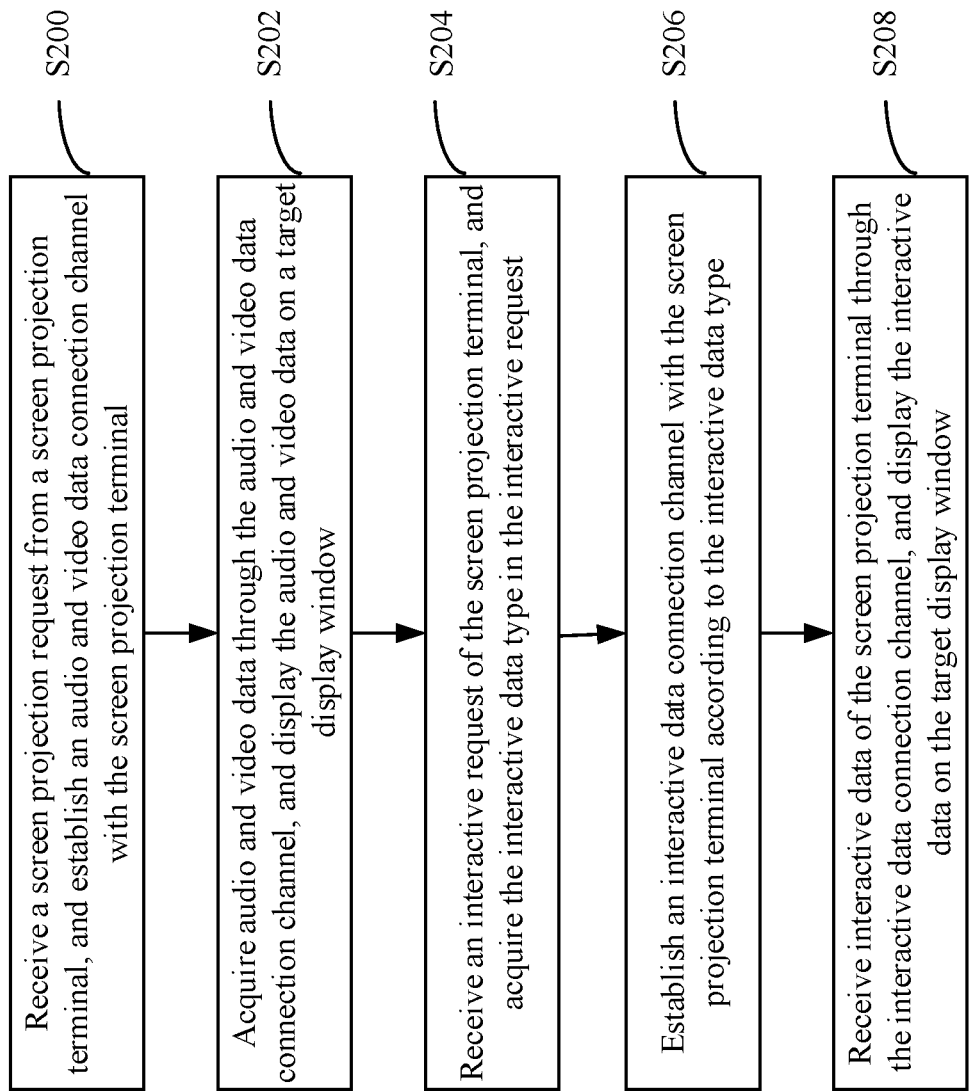
FIG. 2 is a schematic flowchart of a specific embodiment of a multi-screen interactive display method of the present disclosure.

FIG. 2 is a schematic flowchart of an embodiment of a multi-screen interactive display method of the present disclosure. It is to be understood that the flowchart in this method embodiment is not intended to limit the sequence of execution steps. The following is an exemplary description taking the computer device 1 as the execution subject.

As shown in FIG. 2, the multi-screen interactive display method may include steps S200 to S208.

At S200, a screen projection request is received from a screen projection terminal device, and an audio and video data connection channel with the screen projection terminal device is established;

At S202, audio and video data is acquired through the audio and video data connection channel, and the audio and video data is displayed on a target display window.

Specifically, when the user wants to project the audio and video data on the screen projection terminal device onto the computer device 1, the screen projection terminal device first needs to be connected to the computer device 1 through the network, and then the user sends a screen projection request to the computer device 1 through the screen projection terminal device. The computer device 1 receives the screen projection request, and then establishes an audio and video data connection channel according to the screen projection request.

As shown in FIG. 3, in an exemplary embodiment, acquiring audio and video data through the audio and video data connection channel at step S202 includes steps S300 to S302.

At S300, a resource address of the audio and video data in the screen projection request is acquired.

At S302, the resource address is connected through the audio and video data connection channel, and the audio and video data is accessed.

In this embodiment, the screen projection terminal device needs to project video data that is demanded, live or real-time to the computer device 1, therefore, the screen projection terminal device needs to package the format and resource path or address of the audio and video data to be projected into a screen projection request and send it to the computer device 1. Since the audio and video data connection channels generally support most audio formats and video formats, after receiving the screen projection request, the computer device 1 may directly establish an audio and video data connection channel for transmitting the audio and video data in the screen projection content, and then connect with the resource address or path through the audio and video data connection channel, and access the audio and video data, so that the audio and video data may be called and displayed on the target display window.

For example, the screen projection terminal device demands a video a from the resource address A. When the screen projection terminal device is to project the demanded video a to the computer device 1, the screen projection terminal device sends a screen projection request to the computer device 1, and the computer device 1 establishes an audio and video data connection channel according to the screen projection request, then acquires the resource address A from the screen projection request, and finally connects with the resource address A on the screen projection terminal device connection through the audio and video data connection channel, and then accesses and plays the video a. For example, when the screen projection terminal device directly projects the shot audio and video data, the computer device 1 may directly connect to the shooting unit of the screen projection terminal device through the audio and video data connection channel, and acquire the audio and video data shot by the shooting unit of the screen projection terminal device in real time for playing.

At S204, an interactive request of the screen projection terminal device is received, and the interactive data type in the interactive request is acquired.

At S206, an interactive data connection channel with the screen projection terminal device is established according to the interactive data type.

Specifically, in the process of screen projection, the user may also trigger an interactive message through the screen projection terminal device. When the user triggers an interactive message through the screen projection terminal device, for example, if the user makes a bullet screen comment or a reward through the screen projection terminal device, the screen projection terminal device will send an interactive request to the computer device 1. After receiving the interaction request, the computer device 1 acquires the interaction data type in the interaction request. In this embodiment, the interactive data type includes at least one of text, picture, bullet screen comment, reward and gift. Then, the computer device 1 further establishes an interactive data connection channel with the screen projection terminal device according to the interactive data type, and the interactive data connection channel is configured to transmit the interactive data. That is, the interactive data connection channel is a second connection channel different from the audio and video data connection channel.

As shown in FIG. 4, in an exemplary embodiment, establishing the interactive data connection channel with the screen projection terminal device according to the interactive data type at step S206 includes steps S400 to S402.

At S400, the corresponding interactive data connection channel type and establishment rule are inquired from a preset interactive data connection channel information table according to the interactive data type.

At S402, the interactive data connection channel of the interactive data connection channel type is established according to the establishment rule.

Specifically, the computer device 1 and the screen projection terminal device are pre-configured with an interactive data connection channel information table including the establishment rule of the interactive data connection channel for different interactive data. Therefore, after the computer device 1 acquires the interactive data type, the corresponding interactive data connection channel type and establishment rule are inquired from a preset interactive data connection channel information table according to the interactive data type, and then the interactive data connection channel of the interactive data connection channel type is established according to the establishment rule. In this embodiment, the establishment rule includes establishing a data communication link through a preset protocol; and the interactive data connection channel includes a communication link supporting the transmission of interactive data of at least one interactive data type. For example, the general audio and video data connection channel is a data link based on an user datagram protocol (UDP), which only supports audio and video data transmission. Therefore, the computer device 1 may establish a data link of transmission control protocol (TCP) which supports interactive data types such as bullet screen comment or reward, that is, an interactive data connection channel. Of course, the data format supporting transmission included in the establishment rule of the interactive data connection channel corresponds to the format of the interactive data type.

At S208, the interactive data of the screen projection terminal device is received through the interactive data connection channel, and the interactive data is displayed on the target display window.

After the interactive data connection channel is established, the computer device 1 may receive the interactive data sent by the screen projection terminal device through the interactive data connection channel, and then display the interactive data to the video playing picture of the target display window.

Figure 5:
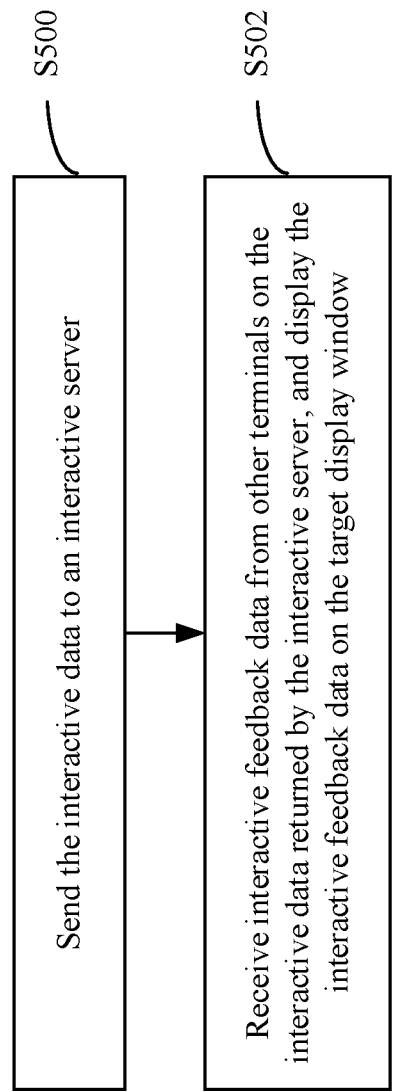
FIG. 5 is a schematic flowchart based on the specific embodiment of FIG. 2.

As shown in FIG. 5, in an exemplary embodiment, the multi-screen interactive display method may include steps S500 to S502 in addition to steps S200 to S208.

At S500, the interactive data is sent to an interactive server.

At S502, interactive feedback data is received from other terminal devices on the interactive data returned by the interactive server, and the interactive feedback data is displayed on the target display window.

Specifically, since the interactive message of multiple terminal devices for the same playing video need to be communicated to each other, after the computer device 1 acquires the interactive data sent by the screen projection terminal device, it will also forward it to the interactive server, the interactive server stores all the interactive data of the same video, and the interactive server will push the interactive data to other video playing terminal devices after receiving the interactive data. Then, the computer device 1 may also receive the interactive feedback data of other terminal devices on the interactive server, and display the interactive feedback data on the target display window.

Of course, after the computer device 1 displays the interactive feedback data on the target display window, it will also send the interactive feedback data to the screen projection terminal device through an interactive connection channel.

Figure 6:
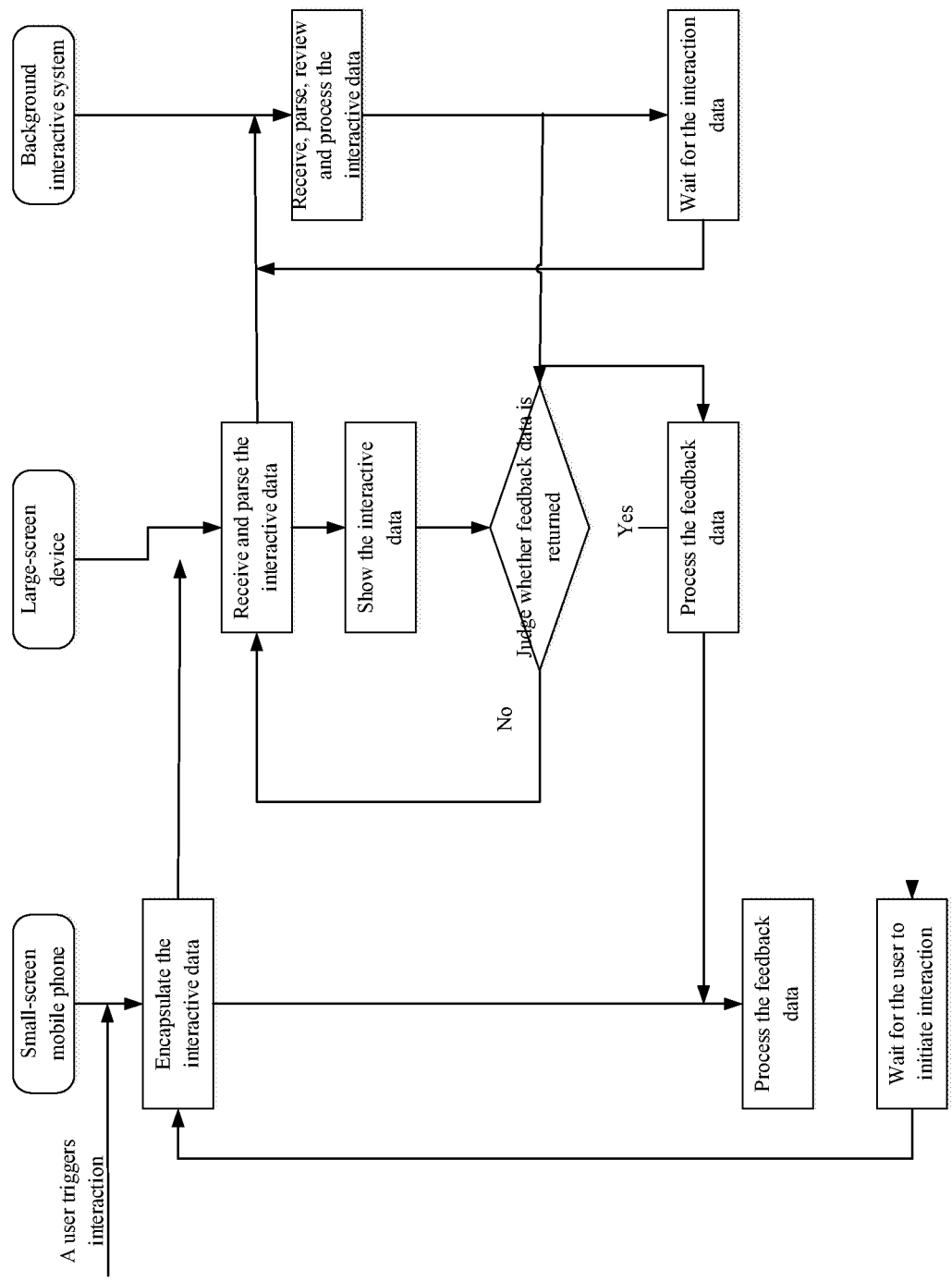
FIG. 6 is a flow effect diagram of a specific embodiment of the multi-screen interactive display method of the present disclosure.

A flow effect diagram of a specific embodiment is shown in FIG. 6. Firstly, the user triggers the interaction on a small-screen mobile phone, and then the small-screen mobile phone encapsulates the interactive data according to the interaction triggered by the user; the small-screen mobile phone sends the encapsulated interactive data to a large-screen device (i.e. the computer device 1) through the interactive data connection channel. Then, the large-screen device receives and parses the interactive data, and displays the interactive data on the video playing window. At the same time, the large-screen device sends the interactive data to a background interactive system (i.e. the interactive server), which receives, parses, examines and processes the interactive data. The background interactive system is to check the interactive data, appropriately modify or delete the unqualified interactive data, and store the qualified interactive data. Then, the large-screen device will also judge whether the background interactive system returns feedback data. When the background interactive system returns feedback data, the large-screen device will display and process the feedback data; at the same time, the feedback data will be sent to the small-screen mobile phone through the interactive data connection channel. Finally, the small-screen mobile phone receives the feedback data and then waits for the user to initiate a new interaction.

To sum up, the multi-screen interactive display method provided in this embodiment can: establish an audio and video data connection channel after receiving a screen projection request from a screen projection terminal device, acquire audio and video data through the audio and video data connection channel, and display the audio and video data on a target display window; then, receive an interactive request of the screen projection terminal device, acquire the interactive data type in the interactive request, and establish an interactive data connection channel with the screen projection terminal device according to the interactive data type; finally, receive interactive data of the screen projection terminal device through the interactive data connection channel, and display the interactive data on the target display window. By establishing an interactive data connection channel independent of the audio and video data connection channel, compared with the current screen projection by a small-screen device to a large-screen device, the screen projection is generally in a mirror mode or the audio and video data is directly sent by a small-screen device to a large-screen device for playing, so that more types of screen projection contents are supported, and the interactivity of screen projection is implemented.

Embodiment Two

Figure 7:
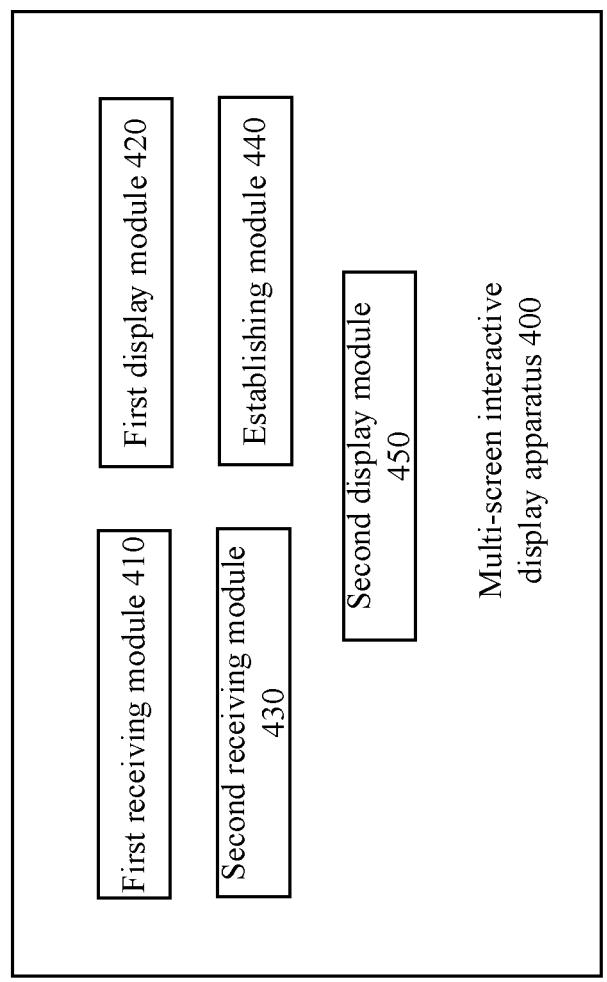
FIG. 7 is a schematic diagram of a program module of an embodiment of a multi-screen interactive display apparatus of the present disclosure.

FIG. 7 schematically shows a block diagram of a multi-screen interactive display apparatus according to Embodiment two of the present disclosure, which may be divided into one or more program modules, and one or more program modules are stored in a storage medium and executed by one or more processors to implement the embodiment of the present disclosure. The program module referred to in the embodiment of the present disclosure refers to a series of computer-readable instruction segments that may perform a specific function. The following description will specifically introduce the functions of each program module in this embodiment.

As shown in FIG. 7, the multi-screen interactive display apparatus 400 may include a first receiving module 410, a first display module 420, a second receiving module 430, an establishing module 440 and a second display module 450.

The first receiving module 410 is configured to receive a screen projection request from a screen projection terminal device, and establish an audio and video data connection channel with the screen projection terminal device.

The first display module 420 is configured to acquire audio and video data through the audio and video data connection channel, and display the audio and video data on a target display window.

The second receiving module 430 is configured to receive an interactive request of the screen projection terminal device, and acquire the interactive data type in the interactive request.

The establishing module 440 is configured to establish an interactive data connection channel with the screen projection terminal device according to the interactive data type.

The second display module 450 is configured to receive interactive data of the screen projection terminal device through the interactive data connection channel, and display the interactive data on the target display window.

In an exemplary embodiment, the first display module 420 is further configured to acquire a resource address of the audio and video data in the screen projection request, and connect with the resource address through the audio and video data connection channel, and access the audio and video data.

In an exemplary embodiment, the establishing module 430 is further configured to inquire the corresponding interactive data connection channel type and establishment rule from a preset interactive data connection channel information table according to the interactive data type, and establish the interactive data connection channel of the interactive data connection channel type according to the establishment rule. The interactive data type includes at least one of text, picture, bullet screen comment, reward and gift; the establishment rule includes establishing a data communication link through a preset protocol; and the interactive data connection channel includes a communication link supporting the transmission of interactive data of at least one interactive data type.

In an exemplary embodiment, the second display module 450 is further configured to send the interactive data to an interactive server, receive interactive feedback data from other terminal devices on the interactive data returned by the interactive server, display the interactive feedback data on the target display window, and send the interactive feedback data to the screen projection terminal device through an interactive connection channel.

Embodiment Three

Figure 8:
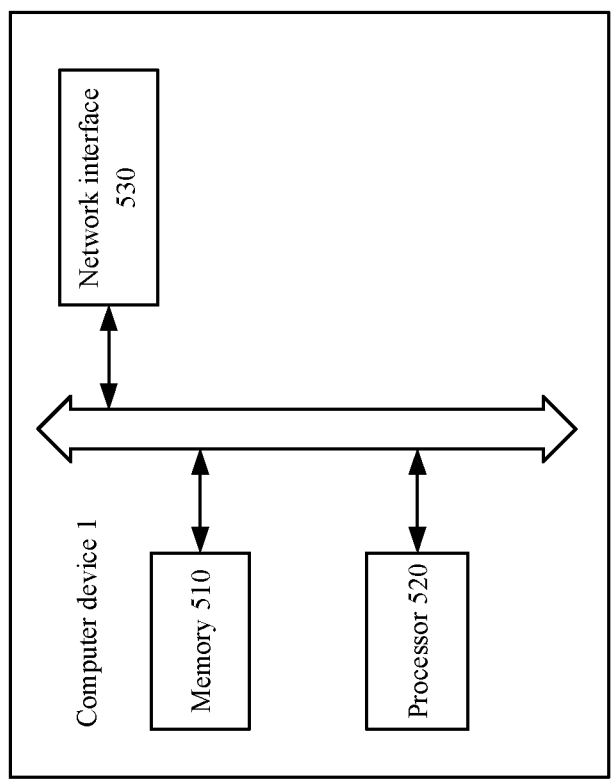
FIG. 8 is a schematic diagram of an optional hardware architecture of a computer device of the present disclosure.

FIG. 8 schematically shows the hardware architecture diagram of the computer device 1 suitable for implementing the multi-screen interactive display method according to Embodiment three of the present disclosure. In this embodiment, the computer device 1 is a device that can automatically perform numerical calculation and/or information processing according to preset or stored instructions. For example, it may be a rack server, a blade server, tower server or a cabinet server (including an independent server, or a server cluster composed of multiple servers) with a gateway function. As shown in FIG. 8, the computer device 1 at least includes, but is not limit to, a memory 510, a processor 520 and a network interface 530 which may communicate with each other through a system bus.

The memory 510 includes at least one type of computer-readable storage medium, and the computer-readable storage medium includes flash memory, hard disk, multimedia card, card-type memory (such as SD or DX memory and the like), random access memory (RAM), static random access memory (SRAM), read-only memory (ROM), electrically erasable programmable read-only memory (EEPROM), programmable read-only memory (PROM), magnetic memory, magnetic disk, optical disk and the like. In some embodiments, the memory 510 may be an internal memory module of the computer device 1, such as a hard disk or a memory of the computer device 1. In other embodiments, the memory 510 may also be an external storage device of the computer device 1, such as a plug-in hard disk, a smart media card (SMC), a secure digital (SD) card, a flash card and the like provided on the computer device 1. Of course, the memory 510 may also include both an internal storage module of the computer device 1 and an external storage device of the computer device. In this embodiment, the memory 510 is generally configured to store the operating system and various application software installed in the computer device 1, such as program codes of the multi-screen interactive display method, and the like. In addition, the memory 510 may also be configured to temporarily store various types of data that have been output or will be output.

In some embodiments, the processor 520 may be a central processing unit (CPU), a controller, a microcontroller, a microprocessor, or other data processing chips. The processor 520 is generally configured to control the overall operation of the computer device 1, such as performing control and processing related to data interaction or communication with the computer device 1. In this embodiment, the processor 520 is configured to run program codes stored in the memory 510 or process data.

The network interface 530 may include a wireless network interface or a wired network interface, the network interface 530 is generally configured to establish communication links between the computer device 1 and other computer devices. For example, the network interface 530 is configured to connect the computer device 1 with an external terminal device through a network, and establish a data transmission channel and communication link between the computer device 1 and the external terminal device. The network may be an intranet, the Internet, the global system of mobile communication (GSM), a wideband code division multiple access (WCDMA), a 4G network, a 5G network, a Bluetooth, a Wi-Fi or other wireless or wired network.

It should be noted that FIG. 8 only shows the computer device with components 510 to 530, but it should be understood that it is not required to implement all the components shown, and more or fewer components may be implemented instead.

In this embodiment, the program code of the multi-screen interactive display method stored in the memory 510 may also be divided into one or more program modules and executed by one or more processors (the processor 520 in this embodiment) to complete the embodiment of the present disclosure.

Embodiment Four

This embodiment further provides a computer-readable storage medium, computer-readable instructions are stored on the computer-readable storage medium, and when executed by a processor, the computer-readable instructions implement the following steps:

receiving a screen projection request from a screen projection terminal device, and establishing an audio and video data connection channel with the screen projection terminal device; acquiring audio and video data through the audio and video data connection channel, and displaying the audio and video data on a target display window; receiving an interactive request of the screen projection terminal device, and acquiring the interactive data type in the interactive request; establishing an interactive data connection channel with the screen projection terminal device according to the interactive data type; and receiving interactive data of the screen projection terminal device through the interactive data connection channel, and displaying the interactive data on the target display window.

In this embodiment, the computer-readable storage medium includes flash memory, hard disk, multimedia card, card-type memory (such as SD or DX memory and the like), random access memory (RAM), static random access memory (SRAM), read-only memory (ROM), electrically erasable programmable read-only memory (EEPROM), programmable read-only memory (PROM), magnetic memory, magnetic disk, optical disk and the like. In some embodiments, the computer-readable storage medium may be an internal storage unit of a computer device, such as a hard disk or memory of the computer device. In other embodiments, the computer-readable storage medium may also be an external storage device of the computer device, such as a plug-in hard disk, a smart media card (SMC), a secure digital (SD) card, a flash card and the like provided on the computer device. Of course, the computer-readable storage medium may also include both an internal storage unit of a computer device and an external storage device of the computer device. In this embodiment, the computer-readable storage medium is generally configured to store the operating system and various application software installed in computer device, such as the program codes of the component management method of the service platform in the embodiment. In addition, the computer-readable storage medium may also be configured to temporarily store various types of data that have been output or will be output.

Obviously, a person skilled in the art should understand that the above-mentioned modules or steps of the embodiments of the present disclosure may be implemented by a general-purpose computing device, and they may be concentrated on a single computing device or distributed on a network composed of multiple computing devices; optionally, they may be implemented by program codes executable by the computing device, so that they may be stored in a storage device and executed by the computing device; and in some cases, the steps shown or described may be performed in a different sequence than here, or they may be separately made into individual integrated circuit modules, or multiple modules or steps of them may be made into a single integrated circuit module. Thus, the embodiments of the present disclosure are not limited to any specific combination of hardware and software.

The above are only the preferred embodiments of the embodiments of the present disclosure, and are not intended to limit the protection scope of the embodiments of the present disclosure. Any equivalent structure or equivalent process transformation made by using the descriptions and accompanying drawings of the embodiments of the present disclosure, or directly or indirectly used in other related technical fields shall fall within the protection scope of the present disclosure.

The invention claimed is:

1. A multi-screen interactive display method, comprising:
receiving a screen projection request from a screen projection terminal device, and establishing an audio and video data connection channel with the screen projection terminal device based on the screen projection request;
acquiring audio and video data through the audio and video data connection channel, and displaying the audio and video data on a target display window;
receiving an interactive request from the screen projection terminal device, and determining a type of interactive data based on the interactive request;
establishing an interactive data connection channel with the screen projection terminal device based on the type of the interactive data, wherein the interactive data connection channel is different from the audio and video data connection channel; and
receiving the interactive data from the screen projection terminal device through the interactive data connection channel, and displaying the interactive data on the target display window.

2. The multi-screen interactive display method of claim 1, wherein the acquiring audio and video data through the audio and video data connection channel comprises:
acquiring a resource address of the audio and video data comprised in the screen projection request; and
connecting with the resource address through the audio and video data connection channel, and accessing the audio and video data.

3. The multi-screen interactive display method of claim 1, wherein the type of interactive data comprises at least one of text, picture, bullet screen comment, reward or gift.

4. The multi-screen interactive display method of claim 1, wherein the establishing the interactive data connection channel with the screen projection terminal device based on the type of the interactive data comprises:
determining a type of the interactive data connection channel and an establishment rule of establishing the interactive data connection channel based on a preset table comprising information about interactive data connection channels corresponding to types of interactive data, wherein the type of the interactive data connection channel and the establishment rule correspond to the type of the interactive data; and
establishing the interactive data connection channel based on the type of the interactive data connection channel and the establishment rule.

5. The multi-screen interactive display method of claim 4, wherein the establishment rule comprises information about establishing a data communication link through a preset protocol; and
wherein the interactive data connection channel comprises a communication link of supporting a transmission of at least one type of interactive data.

6. The multi-screen interactive display method of claim 1, further comprising:
sending the interactive data to an interactive server; and
receiving interactive feedback data returned by the interactive server, wherein the interactive feedback data are sent from other terminal devices and comprise feedback data associated with the interactive data; and
displaying the interactive feedback data on the target display window.

7. The multi-screen interactive display method of claim 6, further comprising:
sending the interactive feedback data to the screen projection terminal device through the interactive data connection channel.

8. A computer device, comprising a memory and a processor, wherein the memory stores computer-readable instructions that upon execution by the processor cause the processor to implement operations comprising:
receiving a screen projection request from a screen projection terminal device, and establishing an audio and video data connection channel with the screen projection terminal device based on the screen projection request;
acquiring audio and video data through the audio and video data connection channel, and displaying the audio and video data on a target display window;
receiving an interactive request from the screen projection terminal device, and determining a type of interactive data based on the interactive request;
establishing an interactive data connection channel with the screen projection terminal device based on the type of the interactive data, wherein the interactive data connection channel is different from the audio and video data connection channel; and
receiving the interactive data from the screen projection terminal device through the interactive data connection channel, and displaying the interactive data on the target display window.

9. The computer device of claim 8, wherein the acquiring audio and video data through the audio and video data connection channel comprises:
acquiring a resource address of the audio and video data comprised in the screen projection request; and
connecting with the resource address through the audio and video data connection channel, and accessing the audio and video data.

10. The computer device of claim 8, wherein the establishing the interactive data connection channel with the screen projection terminal device based on the type of the interactive data comprises:
determining a type of the interactive data connection channel and an establishment rule of establishing the interactive data connection channel based on a preset table comprising information about interactive data connection channels corresponding to types of interactive data, wherein the type of the interactive data connection channel and the establishment rule correspond to the type of the interactive data; and establishing the interactive data connection channel based on the type of the interactive data connection channel and the establishment rule.

11. The computer device of claim 10,
wherein the establishment rule comprises information about establishing a data communication link through a preset protocol; and
wherein the interactive data connection channel comprises a communication link of supporting a transmission of at least one type of interactive data.

12. The computer device of claim 8, wherein the operations further comprise:
sending the interactive data to an interactive server; and
receiving interactive feedback data returned by the interactive server, wherein the interactive feedback data are sent from other terminal devices and comprise feedback data associated with the interactive data; and
displaying the interactive feedback data on the target display window.

13. The computer device of claim 12, wherein the operations further comprise:
sending the interactive feedback data to the screen projection terminal device through the interactive data connection channel, wherein the type of interactive data comprises at least one of text, picture, bullet screen comment, reward or gift.

14. A non-transitory computer-readable storage medium, wherein the computer-readable storage medium stores computer-readable instructions that upon execution by at least one processor to cause the at least one processor to perform operations comprising:
receiving a screen projection request from a screen projection terminal device, and establishing an audio and video data connection channel with the screen projection terminal device based on the screen projection request;
acquiring audio and video data through the audio and video data connection channel, and displaying the audio and video data on a target display window;
receiving an interactive request from the screen projection terminal device, and determining a type of interactive data based on the interactive request;
establishing an interactive data connection channel with the screen projection terminal device based on the type of the interactive data, wherein the interactive data connection channel is different from the audio and video data connection channel; and
receiving the interactive data from the screen projection terminal device through the interactive data connection channel, and displaying the interactive data on the target display window.

15. The non-transitory computer-readable storage medium of claim 14, wherein the acquiring audio and video data through the audio and video data connection channel comprises:
acquiring a resource address of the audio and video data comprised in the screen projection request; and
connecting with the resource address through the audio and video data connection channel, and accessing the audio and video data.

16. The non-transitory computer-readable storage medium of claim 14, wherein the establishing the interactive data connection channel with the screen projection terminal device based on the type of the interactive data comprises:
determining a type of the interactive data connection channel and an establishment rule of establishing the interactive data connection channel based on a preset table comprising information about interactive data connection channels corresponding to types of interactive data, wherein the type of the interactive data connection channel and the establishment rule correspond to the type of the interactive data; and
establishing the interactive data connection channel based on the type of the interactive data connection channel and the establishment rule.

17. The non-transitory computer-readable storage medium of claim 16,
wherein the establishment rule comprises information about establishing a data communication link through a preset protocol; and
wherein the interactive data connection channel comprises a communication link of supporting a transmission of at least one type of interactive data.

18. The non-transitory computer-readable storage medium of claim 14, wherein the operations further comprise:
sending the interactive data to an interactive server; and
receiving interactive feedback data returned by the interactive server, wherein the interactive feedback data are sent from other terminal devices and comprise feedback data associated with the interactive data; and
displaying the interactive feedback data on the target display window.

19. The non-transitory computer-readable storage medium of claim 18, wherein the operations further comprise:
sending the interactive feedback data to the screen projection terminal device through the interactive data connection channel, wherein the type of interactive data comprises at least one of text, picture, bullet screen comment, reward or gift.

* * * * *